3,657,188
CONTINUOUS PRODUCTION OF RESOLES
Carl C. Perkins, Jr., Prairie Village, Kans., assignor to Butler Manufacturing Company, Kansas City, Mo.
No Drawing. Filed Mar. 2, 1970, Ser. No. 15,860
Int. Cl. C08g 5/06, 5/18
U.S. Cl. 260—60                 6 Claims

ABSTRACT OF THE DISCLOSURE

A new, low viscosity, low water content phenol aldehyde resole and a method of producing the resole continuously by controlling the temperatures and time of reaction. The time of reaction is controlled by both moving the reactants from one zone to another and by neutralizing prior to removal of excess water.

BACKGROUND OF THE INVENTION

Field of the invention

The present invention contemplates novel phenol aldehyde resoles of low viscosity and low water content which are infinitely dilutable in water, and a novel continuous process for producing the resole.

Description of the prior art

Processes for producing phenol aldehyde resole resins have been known for many years and it has even been known to produce such resoles continuously. However, these continuous processes have been almost exclusively devoted to the production of novolaks. The resoles produced by both the batch process and previously described continuous processes have had certain disadvantages in that they are usually miscible with water. Only small amounts of this can cause difficulty in their use, particularly where they are to be used with a larger water content than produced. It also causes difficulty when they are to be mixed with other reactants, for instance in producing cellular polyurethanes. Batch process resoles can be dispersed in liquid polyisocyanates, for example, but true solutions do not result.

In continuously producing resoles in known apparatus there are further disadvantages in that there is often polymer film buildup in the reactors which makes the apparatus expensive to maintain. It is also necessary to use separators in these processes due to the immiscibility of the resole in water. Further, none of the continuous processes known to date will produce resoles with a combination of low water content, low free formaldehyde content and low viscosity.

Many methods have been used to control the reaction in continuous processes for producing resoles such as limiting the concentration of catalyst present at any given time by means of several catalyst additions in small quantities at various stages of the reaction. Certain temperature controls have been used, but they have not materially affected the results. It has even been known to add the reactants at various rates to control the reaction, such as sequential addition of formaldehyde. All of the continuous processes have necessitated various complicated apparatus to achieve their purpose. The resoles produced either by batch or continuous process of the prior art due to their higher viscosity have low miscibility with water and have been difficult to handle, particularly with known equipment for cellular plastics production.

Resoles of low viscosity, low water content and high water miscibility are desirable for numerous purposes and there have been no processes for producing them. There is, therefore, a need for such products and a need for a method of producing them, particularly a continuous method.

SUMMARY OF THE INVENTION

It is, accordingly, one object of the present invention to provide a new, low viscosity, low water content, water-miscible phenol aldehyde resole resin which is infinitely miscible with water.

Another object of the invention is to produce a low viscosity, low water content resole phenol aldehyde resin by means of a new continuous process.

Yet another object of the invention resides in a novel process of producing resole resins, wherein the viscosity is carefully controlled by means of controlling the reaction of the phenol and aldehyde by using one or more zones of reaction, wherein, both temperature and time of the reactants in the zone is carefully controlled.

A further object of the invention resides in a novel process for producing low viscosity resole resins wherein the resin material is neutralized prior to drying.

A still further object of the invention is to set forth a novel continuous process for producing low viscosity, low water content resole resins which are miscible with water and which uses an apparatus which is much simpler, easier to maintain and less expensive due to the process steps and which does not require additional apparatus for separating water from water-immiscible resole.

These and other advantages of the present invention will become apparent from the following description and examples.

In accordance with the above object, it has been found that phenol aldehyde resins can be produced with low viscosity (below 10,000 centipoises) and low water content (1.5%) in a continuous process.

It has further been found that due to the inherent low viscosity and, therefore, molecular weight of the resole there is no separation into resin-rich and water-rich phases, and the product is infinitely miscible with water. The product is also capable of forming solutions with other reactants such as tolylenediisocyanate and other liquid, aromatic polyisocyanate. These resoles are also capable of dissolving up to about 20 parts by weight of $CCl_3F$ in 100 parts by weight of resole. This is important in producing polyurethane foams in view of the fact that foams produced from resoles using $CCl_3F$ as a blowing agent as opposed to foams using water as a blowing agent, have a greater insulating factor.

The viscosity of the resole formed is controllable by providing sufficient heat to cause the reaction to take place and subsequently controlling the temperature of reaction very carefully so that the initial exotherm is carefully moderated, limiting the amount of polymerization occuring. By carefully controlling the temperature and time of the reactants in the zone or zones of reaction, the viscosity can be controlled. A further control of the viscosity is achieved by neutralizing the alkaline catalyst prior to evaporative removal of excess water so that no further polymerization occures in the evaporator.

The essential controlling steps of the continuous process are the following:

(1) The exothermic phase of the reaction is caused to occur under controlled conditions of temperature and heat exchange such that the solution does not gel, the pressure stays at or below one atmosphere and the temperature stays below 210° F.

(2) The resin-forming reaction is completed at the same or a lower temperature but with less stringent control over heat exchange than is needed in Step No. 1.

(3) The resole solution is cooled prior to the addition of acid to neutralize the alkaline catalyst.

(4) Acidification to a pH range of maximum stability is accomplished prior to the application of more heat to remove excess water.

In prior art, the evaporation is done during or after the polymerization but without neutralizing the catalyst. The heat needed to boil the water also causes additional polymerization which means low viscosities are not obtainable at low water contents. The pH range of maximum stability is approximately from 5.0 to 6.5 and more specifically from 5.2 to 5.7.

(5) The excess water is removed in a rising film evaporator within a temperature range of 125–180° F. and a vacuum range of 26.5 to 28.0 in. of mercury.

DESCRIPTION OF THE PREFERRED EMBODIMENTS

In accordance with the present invention, there has been found a new method of continuously producing phenol aldehyde resoles having low viscosity, low water content and water miscibility by controlling the temperatures, time of reaction and by neutralizing prior to the removal of excess water from the resole.

Controlling the rate at which the reaction mixture is passed through the heat exchanger or exchangers when two reaction zones are used and controlling the temperature of the reaction, allow the preparation of resoles with wide ranges of viscosity, all having unusually low water and free formaldehyde content. The removal of water from the resole after it has been neutralized is also advantageous for maintaining a low viscosity at a low water content since substantially no additional polymerization occurs in the evaporator when the resole is within the pH range of 5.0 to 6.5. These features will be better understood by the following specific examples. Mixtures of 85% aqueous phenol and 37% aqueous formaldehyde (Formalin) and a barium oxide catalyst were used to produce a phenol aldehyde resole according to the following examples:

EXAMPLE I (1) The barium oxide was dissolved in the phenol to yield a solution of barium phenate in aqueous phenol.

(2) A static mixer as supplied by Kenics Corporation was used to mix the formalin stream with the barium phenate/phenol stream with a molar ratio of formaldehyde to phenol of 1.8 to 1.

(3) The mixture was run through a heat exchanger in which the temperature of the mixture was maintained at 194° F. The reaction mixture required 14 minutes in this step in order to complete the reaction.

(4) The reaction mixture was passed through a second heat exchanger within which its temperature was lowered to about 70° F.

(5) Dilute (35%) sulfuric acid was added to the resin solution is sufficient amount to neutralize the alkaline barium catalyst and further reduce the pH to approximately 5.5. At this point a resole had been produced which was suitable for those uses in which the high (ca. 40%) water content is not a hindrance and was suitable for storage at ambient temperatures.

(6) In order to prepare the most uniquely useful product, the resole solution was pumped into a climbing film evaporator in which its water content was reduced to 2.55%. At 74° F. its viscosity was 4,800 cps. and its formaldehyde content was 2.97%. It could be diluted with large quantities of water.

Although specific temperatures were mentioned at specific times, it is to be understood that in paragraph No. 3 where the mixture is run into the first heat exchanger the temperature can vary between 170–210° F. and can remain there for a time anywhere from 12 to 20 minutes. It should also be understood that in paragraph No. 4 above in Example I where the mixture is passed through a second heat exchanger, the temperature can vary anywhere from 70 to 120° F. It is also possible that the sulfuric acid used to neutralize the alkaline catalyst can be of a concentration of from 35 to 50%.

Another example of continuously producing the resole using two reaction heat exchangers was as follows:

EXAMPLE II (1) The barium oxide was dissolved in the phenol to yield a solution of barium phenate in aqueous phenol.

(2) The phenate/phenol solution and the aqueous formaldehyde were pumped and metered into a mixing device.

(3) The mixture was conducted through a heat exchanger of sufficient capacity to stabilize the temperature at 210° F. or at its reflux condition. The mixture remained in this heat exchanger zone for 2 minutes.

(4) The partially reacted mixture was conducted through a second heat exchanger during which its temperature was maintained at 188° F. for 14 minutes.

(5) The reaction mixture was passed through a third heat exchanger within which its temperature was lowered to about 70° F.

(6) Dilute (35%) sulfuric acid was added to the resin solution in sufficient amount to neutralize the alkaline barium catalyst and further reduce the pH to approximately 5.5. At this point a resole had been produced and was suitable for those uses in which the high (ca. 40%) water content is not a hindrance and was suitable for storage at ambient temperatures.

(7) In order to prepare the most uniquely useful product, the resole solution was pumped into a climbing film evaporator in which its water content is reduced to 2.73%. Its viscosity was 3750 cps. at 76° F., and its formaldehyde content was 3.27%. Those properties were obtained without sacrificing water dilutability.

As in Example I, it is possible in above Example II to vary the temperature and time of reaction. More specifically, in paragraph No. 4, it is possible to vary the temperature anywhere from 170° to 210° F. and the mixture may remain in the heat exchanger from 12 to 20 minutes. It is possible that the temperature in the third heat exchanger, mentioned in paragraph No. 5, can vary anywhere from 70 to 120° F. and the sulfuric acid used to neutralize the alkaline catalyst can be of a concentration of from 35 to 50%.

The product produced and the process by which it is produced have the following advantages:

(1) The cool, acidified, unstriped resole can be stored and shipped at ambient temperatures rather than keeping it below 40° F. as is usually recommended.

(2) The apparatus itself is much simpler, easier to maintain and less expensive than those described in the prior art.

(3) There is no significant buildup of polymer film in either the reactor or the rising film evaporating apparatus.

(4) The stepwise additions of catalysts or formaldehyde which characterize some of the published methods are not required.

(5) No separators are required in that the resole solution stays as one phase throughout the process.

Although barium oxide as a catalyst is set forth above, other common inorganic alkali catalysts may be used, such as sodium hydroxide. Barium hydroxide is preferred because a sodium catalyzed resin would have to be filtered to remove the crystals of hydrated sodium sulphate, phosphate, etc. according to the neutralizing acid.

With regard to the phenol aldehydes that may be used, other phenol type compounds and other aldehydes are contemplated. Contemplated within the phenols and aldehydes that may be used are those prepared by reacting one mole of at least one monohydric phenol selected from the group consisting of phenol [monohydroxy benzene], cresol, xylenol, and cresylic acid with from one to three moles of at least one aldehyde selected from the group consisting of formaldehyde, acetaldehyde, furfuraldehyde, and reactive polymers of formaldehyde such as paraformaldehyde. The reaction may be carried out in the presence of substantial quantities of water and preferably in the presence of from 0.5% to 3.5%, based on the weight of the phenol, of one or more alkaline catalysts. Any conventional alkaline catalyst suitable for prompting the reaction of phenol and formaldehyde to give a phenolic resole may be employed. Examples of such catalysts are sodium hydroxide, potassium hydroxide, barium hydroxide, calcium hydroxide, calcium oxide, sodium carbonate, and sodium bicarbonate. It will be appreciated that other alkali and alkaline earth metal oxides, hydroxides, carbonates and bicarbonates may be employed.

Having thus described the compositions of the invention in terms of their preferred embodiments which are set forth in the description and the examples of the aforesaid specification, it is apparent to those skilled in the art that various changes and modifications can be made in the composition without departing from the scope of the invention. Thus for example, it is apparent that although only aqueous phenol and aqueous formaldehyde and barium oxide have been set forth in the examples other aldehydes, phenols and catalysts may be used. It is also possible that novolaks can be produced by using an acid catalyst instead of an alkaline catalyst and by increasing the phenol to aldehyde ratio.

I claim:

1. A continuous process for producing a phenol aldehyde resole resin comprising forming a mixture of aqueous phenol, aqueous aldehyde and an alkaline catalyst, passing the mixture into a first heat exchanger maintained at a temperature between about 170 and 210° F. for from 12 to 20 minutes and at a pressure at or below one atmosphere, passing the mixture into a second heat exchanger where the temperature is lowered to between about 70–120° F. neutralizing the alkaline catalyst and subsequently drying to a water content of less than 3 percent to produce a phenol aldehyde resole resin having a viscosity of under 10,000 centipoises.

2. The process of claim 1 wherein prior to passing the mixture into the first heat exchanger it is first passed into a heat exchanger maintained at a temperature of about 220° F. for from 1.5 to 2 minutes to initiate the reaction and moderate its initial exotherm.

3. The process of claim 1 wherein the resole is formed from one mole of phenol and 1.3 to 2.5 moles of formaldehyde, and the alkaline catalyst is barium oxide.

4. The process of claim 2 wherein the resin is formed from one mole of phenol and 1.3 to 2.5 moles of formaldehyde, and the alkaline catalyst is barium oxide.

5. The process of claim 1 wherein the alkaline catalyst is neutralized with sulfuric acid.

6. The process of claim 1 wherein the resole resin produced has a free formaldehyde content of less than 3 percent and a viscosity of under 5,000 centipoises.

References Cited

UNITED STATES PATENTS

| 2,688,606 | 9/1954 | Schmitt et al. | 260—57 |
| 2,034,457 | 3/1936 | Bender | 260—50 |
| 2,190,672 | 2/1940 | Meharg | 260—29.3 |
| 2,446,429 | 8/1948 | Nelson et al. | 260—59 |
| 2,658,054 | 11/1953 | Coleman et al. | 260—57 |
| 2,758,101 | 8/1956 | Shappell | 260—60 X |
| 2,988,536 | 6/1961 | Hine et al. | 260—57 |
| 3,083,170 | 3/1963 | Booty | 260—60 X |
| 3,223,667 | 12/1965 | Herrick et al. | 260—29.3 |
| 3,256,216 | 6/1966 | Erickson et al. | 260—57 X |

OTHER REFERENCES

Australian Journal of Applied Science, vol. 2, pp. 288–305, 1951.

Phenolic Resins, Whitehouse et al., 1967, pp. 106–107, 108–114.

HOWARD E. SCHAIN, Primary Examiner

U.S. Cl. X.R.

260—2.5 F, 29.3, 57 R